Sept. 29, 1959 J. G. HENDRICKSON ET AL 2,906,785
PRODUCTION OF DURENE
Filed Feb. 29, 1956
2 Sheets-Sheet 1

INVENTORS:
Joe G. Hendrickson
Francis T. Wadsworth
BY
Joseph C. Kotarski
ATTORNEY

United States Patent Office 2,906,785
Patented Sept. 29, 1959

2,906,785

PRODUCTION OF DURENE

Joe G. Hendrickson, Texas City, and Francis T. Wadsworth, Dickinson, Tex., assignors to The American Oil Company, Texas City, Tex., a corporation of Texas Application February 29, 1956, Serial No. 568,639

6 Claims. (Cl. 260—668)

This invention relates to a process for producing durene and in particular it concerns a process for producing durene from pseudocumene.

Recently durene has become a highly useful and desirable chemical intermediate. It may be oxidized to pyromellitic anhydride which in turn is esterified and employed as a superior ingredient of protective coating compositions, as a plasticizer, or for many other uses. To produce the desired pyromellitic anhydride it is essential to employ a durene fraction which contains at least about 95% durene. Lower concentrations of durene result in an impure pyromellitic anhydride which in turn adversely affects the quality of the esters and renders them unsuitable commercially.

Because of the large amounts and the high purity in which durene is required, means have been sought for synthesizing it. Attempts have been made to prepare durene by the chloromethylation of pseudocumene followed by hydrogenation. However, a large quantity of durene isomers are also produced. Durene (B.P. 196° C.) cannot be recovered in the desired purity by distillation means because of the closeness of boiling points of its isomers, isodurene (B.P. 197.9° C.) and prehnitene (B.P. 205° C.). To recover the durene it is necessary to resort to expensive crystallization means which include refrigerating equipment, centrifuges, and other necessary and costly equipment. Such a process is commercially unattractive. It has been proposed to produce durene by condensing two mols of pseudocumene with one mol of formaldehyde so as to form dipseudocumylmethane which can be hydrocracked to form one mol of durene and one mol of the initial pseudocumene. Theoretically, such a process should provide durene of the required high purity without resorting to crystallization means to recover it from its isomers. Such a process, however, has many difficulties. Poor yields of dipseudocumylmethane are often obtained in the condensation step, and difficult emulsions of hydrocarbons and acid catalyst are often produced. Low conversions are frequently obtained in the hydrocracking operation. Too often, the hydrocracking catalyst rapidly becomes deactivated. A crucial problem is to avoid forming durene isomers by isomerization thereof during the hydrocracking step, for only a very small amount may render the process uneconomic because of the need for a crystallization step to make 95% purity durene.

An object of this invention is to provide a process for producing durene of commercial purity i.e. containing 95% or more of durene. Another object is to provide a process capable of producing durene from a readily available intermediate i.e. pseudocumene, by a simple and highly economic means. A further object is to provide a process for producing durene which avoids the expensive crystallization process and which produces durene of as high a purity as is produced in a crystallization process. Other objects and advantages of this invention will be apparent from the detailed description thereof.

In accordance with this invention a pseudocumene fraction is reacted with formaldehyde, preferably paraformaldehyde, in the presence of an acid condensation catalyst such as toluene sulfonic acid to form dipseudocumylmethane. At least 95% of the aromatic hydrocarbons in the pseudocumene fraction must be pseudocumene. A molar ratio of pseudocumene to formaldehyde preferably greater than 2:1 is employed. The toluene sulfonic acid may be used in an amount between 0.1 and 5 parts by weight per part of formaldehyde. After the condensation reaction has been carried out for the proper length of time, usually between 1 to 4 hours, dipseudocumylmethane and unreacted pseudocumene are then separated as a hydrocarbon layer from the lower layer of acid condensation catalyst. The dipseudocumylmethane is then filtered through an adsorbent solid, preferably an adsorbent clay such at Attapulgus clay or the like. The filtered dipseudocumylmethane is then hydrocracked in the presence of hydrogen using a molybdena on alumina catalyst which has been activated for the purpose of carrying out this reaction with a minimum amount of isomerization of durene. The catalyst is activated by treating it with a reducing gas, such as hydrogen, under reducing conditions at a temperature between about 350° C. and 750° C. A mol of pseudocumene, which can be recycled to the condensation step, is formed per mol of durene formed in the hydrocracking step. The hydrocracking reaction is carried out under hydrocracking conditions and at a temperature not higher than about 500° C. and usually not lower than 300° C. A pressure not higher than 100 p.s.i.g. is used. The hydrocracking products are then separated (pseudocumene can be recycled), and a tetramethylbenzene fraction can be recovered by distillation which is durene of high purity i.e. 95% purity, which is desired commercially.

The invention will be more clearly understood from the following description and from the accompanying drawings.

Figure 1:
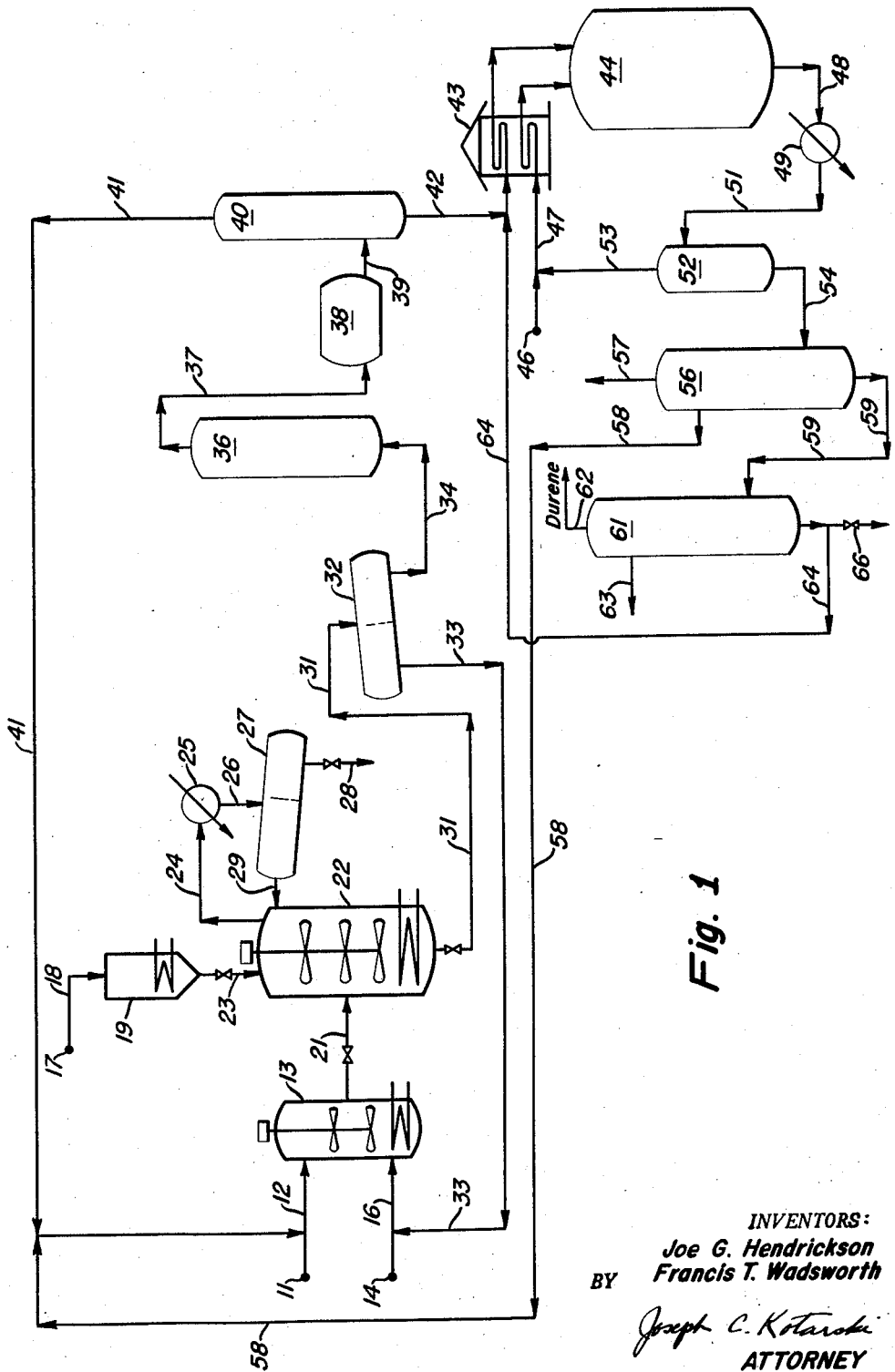
Figure 1 is a diagrammatic representation which illustrates a preferred embodiment of the invention for producing commercial grade (95% purity) durene.

Referring to Figure 1, pseudocumene from source 11 is passed by way of line 12 into vessel 13. Toluenesulfonic acid from source 14 is passed by way of line 16 into vessel 13. The latter vessel is a holding tank equipped with agitation and heating means for raising the temperature of the components to about 100° C. Paraformaldehyde from source 17 is passed by way of line 18 into another holding vessel 19 wherein it is raised to a temperature of about 100° C. The mixture of pseudocumene and toluenesulfonic acid are then passed from holding vessel 13 by way of valved line 21 into condensation reactor 22. The paraformaldehyde is passed from holding vessel 19 by way of valved line 23 into condensation reactor 22. In reactor 22 the pseudocumene and formaldehyde are condensed to form primarily dipseudocumylmethane, along with minor amounts of higher molecular weight condensation products.

In order to obtain durene of commercial purity without resorting to crystallization techniques, it is essential that the pseudocumene fraction which is introduced into reactor 22 be substantially free of other aromatic hydrocarbons and especially free of isomers of pseudocumene. While pure pseudocumene may be employed (such as might be obtained from crystallization processes) it is not essential to do so in this invention. However, at least 95% of the aromatic hydrocarbons contained in the pseudocumene fraction should be pseudocumene. Paraffinic hydrocarbons, such as are normally present in amounts of 1 to 10 percent in commercially available pseudocumene fractions, may be contained therein. Suitable pseudocumene fractions may be obtained by the careful fractionation of hydroformed naphthas. For example, a naphtha which has been hydroformed employing a platinum on alumina catalyst can be fractionated (it is preferred to fractionate an extract thereof such as is obtained when using a selective solvent such as diethyleneglycol, triethyleneglycol, liquid sulfur dioxide, or the like, and a fraction substantially all of which boils at a temperature between 167° and 171° C. may be recovered and used for reaction with the formaldehyde. If desired, paraffinic hydrocarbons, preferably lower boiling than the pseudocumene fraction, may be added to the pseudocumene fraction employed in the condensation step to function as a diluent for the dipseudocumylmethane and thus lower the freezing point of the latter in the mixture. Low boiling aromatics, e.g. benzene, toluene may also be added for this same purpose. When low boiling aromatics are added, they are eventually converted to durene if recycled in the process.

The formaldehyde which is employed is preferably free of water. Thus gaseous formaldehyde or paraformaldehyde are preferred. While formalin may be used, it is not preferred since the rate of reaction with pseudocumene is generally much slower, and the tendency of the condensation products to emulsify is greater.

While the embodiment of the invention illustrated herein employs toluenesulfonic acid of 95% concentration any of a variety of other acid condensation catalysts such as other aryl sulfonic acids, e.g. benzenesulfonic acid, low molecular weight alkanesulfonic acids, 90% sulfuric acid, boron trifluoride, zinc chloride or the like may be used. Toluenesulfonic acid is preferred because of the very high conversions of 80–100% which are obtained with it and because when it is employed a solvent need not be used. While the amount of the acid condensation catalyst used will vary depending upon the particular catalyst and the conditions employed, it may satisfactorily be used in an amount between 0.1 and 5 parts per part by weight of formaldehyde plus any water contained therein.

The reactants are introduced in a ratio of about two mols of pseudocumene per mol of formaldehyde. While this molar ratio may be somewhat less than 2:1, e.g. 1.5:1, molar ratios of 1:1 or thereabouts should not be used since emulsions are obtained, at least when using toluenesulfonic acid. Molar ratios of pseudocumene to formaldehyde of 2:1 and higher, e.g., 5:1 are preferred. The pseudocumene fraction and formaldehyde are contacted with the acid condensation catalyst at a temperature and for a time sufficient to cause the pseudocumene to react with formaldehyde and form dipseudocumylmethane. Temperatures as low as 50° C., or as high as 175° C. are satisfactory when employing toluenesulfonic acid as the catalyst, although even higher or lower temperatures may be employed especially with other catalysts. The reaction between pseudocumene and formaldehyde may be carried out over the course of 0.5 to 10 hours or longer, suitably about 2 to 4 hours.

In the embodiment illustrated herein the pseudocumene fraction employed is obtained by fractionating an extract portion of a naphtha which had been hydroformed over a platinum on alumina catalyst. The pseudocumene fraction boils within the range of 168° to 170° C. Approximately 98% of the aromatic hydrocarbons contained in the pseudocumene fraction are pseudocumene, the remainder being mesitylene and hemimellitene. The pseudocumene fraction also contains about 2 to 3 percent of paraffinic hydrocarbons. It is introduced into condensation reactor 22 in the amount of approximately two mols of pseudocumene per mol of paraformaldehyde. The condensation catalyst used is 95% anhydrous toluenesulfonic acid which is employed in the amount of about one part per part of paraformaldehyde by weight. A reaction temperature of about 100° C. and a reaction time of approximately 4 hours are used.

The condensation of pseudocumene and formaldehyde to form dipseudocumylmethane is effected in condensation reactor 22 in batch fashion. Reactor 22 is equipped with reflux condensing equipment which permit vapors to pass by way of line 24 into condenser 25 and thereafter by way of line 26 into settler 27. A stream consisting primarily of water may be continuously removed from the system by way of valved line 28. If desired, water can be removed from the toluenesulfonic acid after the condensation reaction has been effected. This may be done by azeotropically distilling the aqueous toluenesulfonic acid with added pseudocumene. A pseudocumene stream is returned from settler 27 by way of line 29 to condensation reactor 22. After the condensation reaction has been effected, the reaction products are passed from reactor 22 by way of valved line 31 into settler 32. Settler 32 is operated at a temperature slightly below about 100° C. Lower temperatures may be used when a diluting hydrocarbon is employed for the purpose of reducing the temperature at which crystals of dipseudocumylmethane are formed. The mixture is settled into a lower layer of toluenesulfonic acid and an upper hydrocarbon layer. The lower layer is removed from settler 32 and passed by way of line 33 into line 16 for recycling to holding tank 13.

The upper hydrocarbon layer in settler 32 which consists primarily of dipseudocumylmethane and a minor amount of unreacted pseudocumene is removed and passed by way of line 34 into vessel 36 which contains a suitable solid adsorbent, in this instance Attapulgus clay. Other suitable adsorptive solids include bauxite, silica gel, magnesium silicate, kieselguhr, infusorial earth, diatomaceous earth, and various clays such as fuller's earth and bentonite, which contain primarly aluminum silicates. Among the more commonly known and useful clays are Attapulgus clay and the Florida earths, known by various names such as Floridin and Florex. The hydrocarbon layer is filtered through the bed of Attapulgus clay contained in vessel 36 and removed from the latter by way of line 37 from whence it is passed to holding tank 38. Other filtering techniques such as slurrying with clay fines and then filtering through an Oliver filter press to remove the fines, may be used. The filtering through the adsorbent solid may be carried out at any temperature above the crystalizing temperature of dipseudocumylmethane and below the boiling point of the reaction products. Usually a temperature between about 50° to 150° C., herein about 100° C., is used. Filtering the dipseudocumylmethane through the adsorptive solid increases substantially the extent of conversion of dipseudocumylmethane to durene and pseudocumene and also reduces the rate of catalyst deactivation. The treatment contributes importantly in rendering the process commercially attractive. In this embodiment the hydrocarbon layer is percolated through the Attapulgus clay in the ratio of about 30 barrels per ton of clay, although higher or lower ratios e.g. 1 to 100 barrels per ton of clay may be used.

The filtered hydrocarbon layer is removed from holding vessel 38 and passed by way of line 39 into fractionator 40. In this fractionator a separation is effected between unreacted pseudocumene and a higher boiling fraction consisting primarily of dipseudocumylmethane. Unreacted pseudocumene is removed overhead from fractionator 40 and passed by way of line 41 to line 12 from whence it is recycled to condensation reactor 22. The bottoms fraction which consists essentially of dipseudocumylmethane and a small amount of higher boiling condensation products is then passed from fractionator 40 by way of line 42 to the hydrocracking zone for conversion to durene and pseudocumene. While the embodiment described herein effects a separation between unreacted pseudocumene and dipseudocumylmethane after the clay filtering step, this fractionation can be effected prior to such a step or not at all if so desired. It is preferred to do so however, in order to concentrate the feed to the hydrocracking reactor.

The dipseudocumylmethane which is removed as a bottoms fraction from fractionator 40 is then passed by way of line 42 through furnace 43 and thence into hydrocracking reactor 44. Hydrogen, which may conveniently be a hydrogen stream produced during a hydroforming operation, is passed from source 46 by way of line 47 through furnace 43 and thence into hydrocracking reactor 44. This reactor contains a molybdena on alumina catalyst which has been activated for carrying out the hydrocracking in a highly selective manner so as to minimize the production of the undesired durene isomers. The molybdena on alumina catalyst may be one such as is commonly used in hydroforming, the said "hydroforming" being a term applied to processes of the type described in U.S. 2,320,147, U.S. 2,388,536, etc. which detail the manner in which a virgin naphtha is contacted with a molybdena on alumina catalyst at temperatures of about 925° F. and pressures of 200 p.s.i.g. in the presence of hydrogen to produce a high octane number gasoline. The catalyst may be prepared by any of the many techniques known in the art. The molybdena may be incorporated in the alumina catalyst base in any known manner e.g. by impregnation, coprecipitation, cogelling and/or absorption. The catalyst base and/or finished catalyst may be heat stabilized by methods heretofore used in the preparation of hydroforming catalysts. A typical molybdena on alumina catalyst which may be used will have from 5 to 15% of molybdena e.g. 9%, the remainder being activated alumina with minor amounts of impurities or added agents. Methods of preparing molybdena on alumina catalysts are described in detail in patents such as U.S. Reissue 22,196, U.S. 2,404,024, U.S. 2,454,724, U.S. 2,410,558 and others.

As has been stated, the molybdena on alumina catalyst is activated prior to use in the hydrocracking reaction. The reduction treatment is not applied to the molybdena component before it is incorporated in the catalyst mass. The activation or reducing treatment is applied after the molybdena has been incorporated on the alumina support. The conditioning or reducing treatment of the hexavalent molybdena is preferably effected with hydrogen although other reducing agents such as carbon monoxide, mixtures of hydrogen and carbon monoxide (water gas, synthesis gas, etc.) sulfur dioxide, hydrogen sulfide, dehydrogenatable hydrocarbons, etc., may be employed. Hydrogen can be employed as a reducing agent at temperatures between about 350° C. and about 750° C., although it is more often employed at temperatures within the range of 450° C. to 650° C. The hydrogen partial pressure in the reducing or conditioning operation may be varied from subatmospheric pressures, for example even 0.1 p.s.i.a. to relatively high pressures up to 3000 p.s.i.g., or even more. The simplest reducing operation may be effected with hydrogen simply at about atmospheric pressure. The partial reduction of the molybdena is carried out to the extent that the average valence state of the finished molybdena catalyst lies within the range of about 2 to about 5.5, preferably between about 3 and about 5. The reduction of the molybdena on alumina catalyst enables the production of a high ratio of durene to isodurene in the hydrocracking products. The reason why this reduction of the molybdena has such an advantageous influence on the distribution of tetramethylbenzenes in the product is not understood, although it appears that it reduces the isomerization tendency of the hydrocracking catalyst.

In carrying out the hydrocracking reaction, it is important that a temperature not higher than about 500° C. be employed and that a pressure not higher than about 100 p.s.i.g. be used. If these conditions are exceeded, an undesirably large amount of durene isomers are formed thus requiring crystallization of the product to produce commercial quality durene. For example if a temperature of 500° C. and a pressure of 250 p.s.i.g. is used, the product will contain 80% durene and 20% isodurene. The reaction is carried out in the presence of at least one mol of hydrogen per mol of dipseudocumylmethane. Ordinarily from 1 to 50 mols, e.g. 1 to 20 mols of hydrogen per mol of dipseudocumylmethane will be satisfactory. A space velocity of between about 0.1 and 10 liquid volumes of hydrocarbon/hour/volume of catalyst may be used. In the embodiment illustrated herein a temperature of 450° C. and a pressure of about 5 atmospheres is used. Hydrogen is introduced into the hydrocracking reactor in the amount of about 5 mols per mol of dipseudocumylmethane. A space velocity of approximately 0.5 liquid volumes of dipseudocumylmethane/hour/volume of catalyst is used.

The hydrocracking products are removed from hydrocracking reactor 44 (herein shown as one vessel, although obviously a number may be used) and passed by way of line 48 into cooler 49. The cooled products are then passed by way of line 51 into gas separator 52. An overhead gaseous stream is removed from separator 52 by way of line 53. This stream, which is essentially hydrogen, is recycled by way of line 53 to line 47 and then back to hydrocracking reactor 44.

From the bottom of separator 52 a liquid fraction is removed and passed by way of line 54 into fractionator 56. An overhead stream consisting of products lower boiling than xylenes is removed from the system by way of line 57. A pseudocumene side stream containing some xylenes is removed by way of line 58 and recycled to line 41 which returns it to source 11 for conversion to dipseudocumylmethane and subsequently to durene. A bottoms fraction is removed from fractionator 56 and passed by way of line 59 to fractionator 61. In fractionator 61 a separation is effected so as to produce 3 fractions. An overhead stream of essentially pure durene, contaminated with only one or two percent of isodurene, is removed from fractionator 61 by way of line 62. A side stream is removed from fractionator 61 by way of line 63. This side stream contains the major portion of the prehnitene and pentamethylbenzenes along with some isodurene produced in the process. A bottoms fraction which consists substantially all of dipseudocumylmethane is removed from fractionator 61 and passed by way of line 64 to line 42 by which it is recycled to hydrocracking reactor 44 for conversion thereof to durene and pseudocumene. If desired, a portion of this dipseudocumylmethane stream may be removed from the system by way of valved line 66.

The importance of certain features of this invention were demonstrated in laboratory experiments. The highly advantageous effect of treating the crude dipseudocumylmethane by filtering through an adsorptive solid was demonstrated in certain experiments. Dipseudocumylmethane was prepared by reacting two mols of pseudocumene with one mol of paraformaldehyde using toluenesulfonic acid as a catalyst in the amount of 0.84 part per part of paraformaldehyde by weight. A reaction temperature of about 100° C. and a reaction time of about 2 hours was used. A hydrocarbon layer, which had been diluted to a 44% concentration of dipseudocumylmethane by the addition of benzene, was separated from a lower acid layer. Portions of the benzene solution of dipseudocumylmethane were then treated in different fashions. One portion was washed with an equal volume of 5% caustic solution and another portion was percolated through Attapulgus clay in the ratio of about 30 barrels per ton of clay. Analysis of the untreated and treated feeds were made for formaldehyde, water, and acid content. The treated products, as well as a portion of the untreated product, were then hydrocracked at 400° C. and atmospheric pressures using a space velocity of 0.7 liquid volumes of hydrocarbon/hour/volume of catalyst and hydrogen in the amount of two mols per mol of dipseudocumylmethane. A molybdena on alumina catalyst containing 9% $MoO_3$ (the remainder being essentially alumina) was used as the hydrocracking catalyst. The catalyst has been activated by reducing it with hydrogen at about atmospheric pressure for approximately one-half hour at a temperature of about 625° C. The hydrocracking products were collected during 3 consecutive 3½ hour periods and the unreacted dipseudocumylmethane was measured to determine the extent of conversion thereof to lower boiling products. The results are shown in Table I which follows:

Table I

| Treatment of feed | Analysis of feed | | | Conversion [1] of feed, percent |
|---|---|---|---|---|
| | Formaldehyde, weight, percent | Water, weight, percent | Acid, meg 1 gm. | |
| None | 0.21 | 0.046 | 6.9 | 75 |
| Caustic washed | Nil | 0.13 | 2.2 | 72 |
| Clay filtered | Nil | 0.083 | 1.9 | 98 |

[1] After 10 hours of operation on the feed.

It was found that the feed which had been caustic washed steadily deactivated the catalyst or otherwise caused a lowering of conversion. The extent of conversion dropped off from 91.4% in the first period down to 72% in the third period. Caustic washing thus did not improve the facility with which the feed could be hydrocracked, since the untreated dipseudocumylmethane was converted to about the same extent i.e. 75%. Surprisingly it was found that the clay filtered feed was 98% converted from the first through the third periods. If one examines the analyses of the various feedstocks, there seems to be no positive relationship between the various contaminants (and the amounts in which they are present) and the degree of conversion which is obtained. No explanation for the phenomenon is known.

Figure 2:
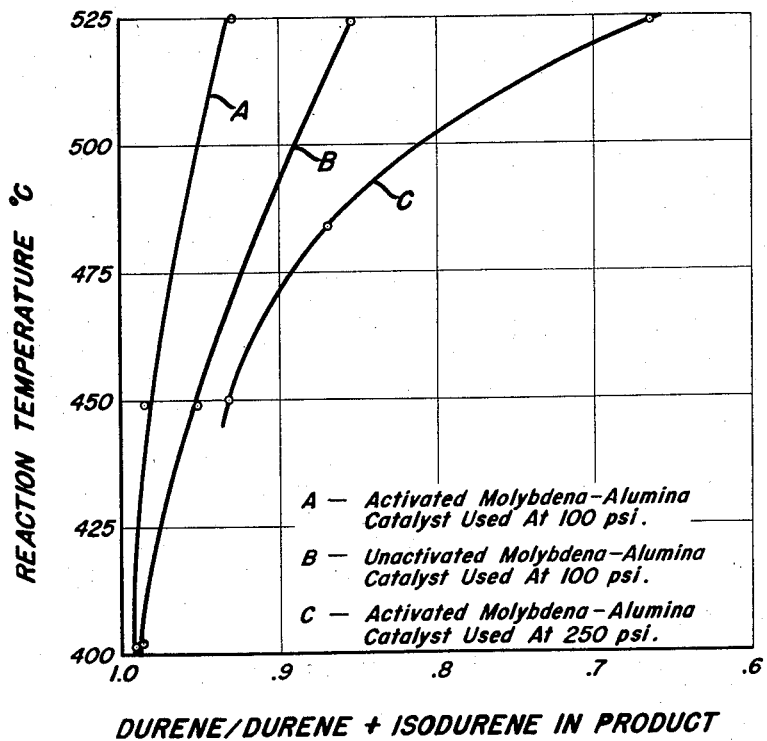
Figure 2 is a graphical representation of the effect which activation of the molybdena on alumina hydrocracking catalyst, as well as operating temperatures and pressures of the hydrocracking process, has on the purity of the durene which is produced.

Figure 2 graphically illustrates the importance of activating the catalyst and maintaining a controlled relationship of operating temperature and pressure in the hydrocracking zone in order to maximize the ratio of durene to isodurene which is produced. The dipseudocumylmethane was prepared in the manner previously recited for production of dipseudocumylmethane in the laboratory. The hydrocracking reaction was carried out under varied conditions of operating temperatures and pressures, while using hydrogen in the amount of 50 mols per mol of dipseudocumylmethane and operating at a space velocity of 0.7. In certain experiments a standard molybdena on alumina hydroforming catalyst (the analysis of which was presented previously) was used, whereas in other experiments an activated catalyst which had been reduced with hydrogen at 625° C. for one-half hour under a hydrogen pressure of 100 p.s.i.g. was employed. In the accompanying Figure 2 the effect of activation of the catalyst, and the operating temperatures and pressures is shown.

It will be observed from curve A of Figure 2 that activating the catalyst and using it at an operating pressure of 100 p.s.i.g. and a temperature of less than 500° C. is crucially important if one desires to produce durene sufficiently free of its isomers so as to avoid the necessity of a crystallization step to obtain 95% purity durene. It is readily apparent from curve B of Figure 2 that if the catalyst is not activated by the reducing treatment, an undesidably large amount of isodurene is formed and lesser amounts of durene are formed. It will also be noted from curve C of Figure 2 that operating at a pressure of 250 p.s.i.g. in the hydrocracking reactor produces larger amounts of isodurene than if a pressure of 100 p.s.i.g. or lower were employed. Thus the features of employing a molybdena on alumina catalyst, which has been activated in the defined manner, and operating the hydrocracking step at a pressure of 100 p.s.i.g. or less and a temperature of 500° C. or less are vital in producing 95% purity durene without resorting to expensive crystallization equipment.

Thus having described the invention, what is claimed is:

1. A process for the production of durene which comprises reacting a pseudocumene fraction, at least 95% of the aromatic hydrocarbons contained therein being pseudocumene, with formaldehyde in the presence of an acid condensation catalyst thereby forming dipseudocumylmethane; separating a hydrocarbon layer containing dipseudocumylmethane from the acid condensation catalyst; filtering dipseudocumylmethane through an adsorbent solid; hydrocracking the filtered dipseudocumylmethane and thereby producing durene and pseudocumene by contacting the filtered dipseudocumylmethane in the presence of hydrogen under hydrocracking conditions with a catalyst comprising essentially a minor proportion of molybdena extended upon a major proportion of an alumina support, which molybdena has been partially reduced when present on said support by treatment with a reducing gas under reducing conditions comprising a temperature between about 350° C. and about 750° C.; said hydrocracking conditions comprising a temperature not higher than about 500° C. and a pressure not higher than about 100 p.s.i.g.; and recovering durene from the hydrocracking products.

2. The process of claim 1 wherein the formaldehyde is paraformaldehyde.

3. The process of claim 1 wherein the acid condensation catalyst is toluenesulfonic acid.

4. The process of claim 1 wherein said adsorbent solid is an adsorbent clay.

5. A process for the production of durene which comprises reacting a pseudocumene fraction, at least 95% of the aromatic hydrocarbons contained therein being pseudocumene, with formaldehyde in the presence of toluenesulfonic acid and forming dipseudocumylmethane, a molar ratio of pseudocumene to paraformaldehyde of at least 2:1 being employed; separating a hydrocarbon layer containing dipseudocumylmethane from a layer of toluenesulfonic acid; filtering the hydrocarbon layer through an adsorbent clay; hydrocracking the filtered hydrocarbon layer and thereby producing durene and pseudocumene by contacting the filtered hydrocarbon layer in the presence of hydrogen under hydrocracking conditions with a catalyst comprised essentially of a minor proportion of molybdena extended on a major proportion of an alumina support, which molybdena has been partially reduced when present on said support by treatment with a reducing gas under reducing conditions comprising a temperature between about 350° C. and about 750° C.; effecting the hydrocracking at a temperature between about 300° and 500° C. in the presence of between about 1 and 20 mols of hydrogen per mol of dipseudocumylmethane at a pressure between atmospheric and 100 p.s.i.g. and at a space velocity between about 0.1 and 10 liquid volumes of hydrocarbon/hour/volume of catalyst; and fractionating the hydrocracking products to recover a tetramethylbenzene fraction consisting essentially of durene.

6. The process of claim 5 wherein toluenesulfonic acid is employed in an amount between about 0.1 and 5 parts per part of formaldehyde by weight.

References Cited in the file of this patent

UNITED STATES PATENTS 2,486,542    Weisler et al. _____ Nov. 1, 1949

(Other references on following page)

UNITED STATES PATENTS

| | | | |
|---|---|---|---|
| 2,527,529 | Cade | Oct. 31, | 1950 |
| 2,626,967 | Darragh et al. | Jan. 27, | 1953 |
| 2,653,979 | Kropa et al. | Sept. 29, | 1953 |
| 2,739,133 | Schwarzenbek | Mar. 20, | 1956 |
| 2,761,885 | DeJong et al. | Sept. 4, | 1956 |
| 2,764,620 | Findlay | Sept. 25, | 1956 |

FOREIGN PATENTS

| | | | |
|---|---|---|---|
| 204,735 | Australia | Dec. 4, | 1956 |

OTHER REFERENCES

Shacklett et al.: Jour. Amer. Chem. Soc., vol. 73, 1951, pp. 766–768.